Feb. 22, 1938.  F. CONTARDI  2,109,191
SUSPENSION AND DRIVING SYSTEM FOR MOTOR VEHICLES
Filed Oct. 21, 1935  2 Sheets-Sheet 1

Inventor:
F. Contardi
By Glascock Downing & Sebold
Attorneys.

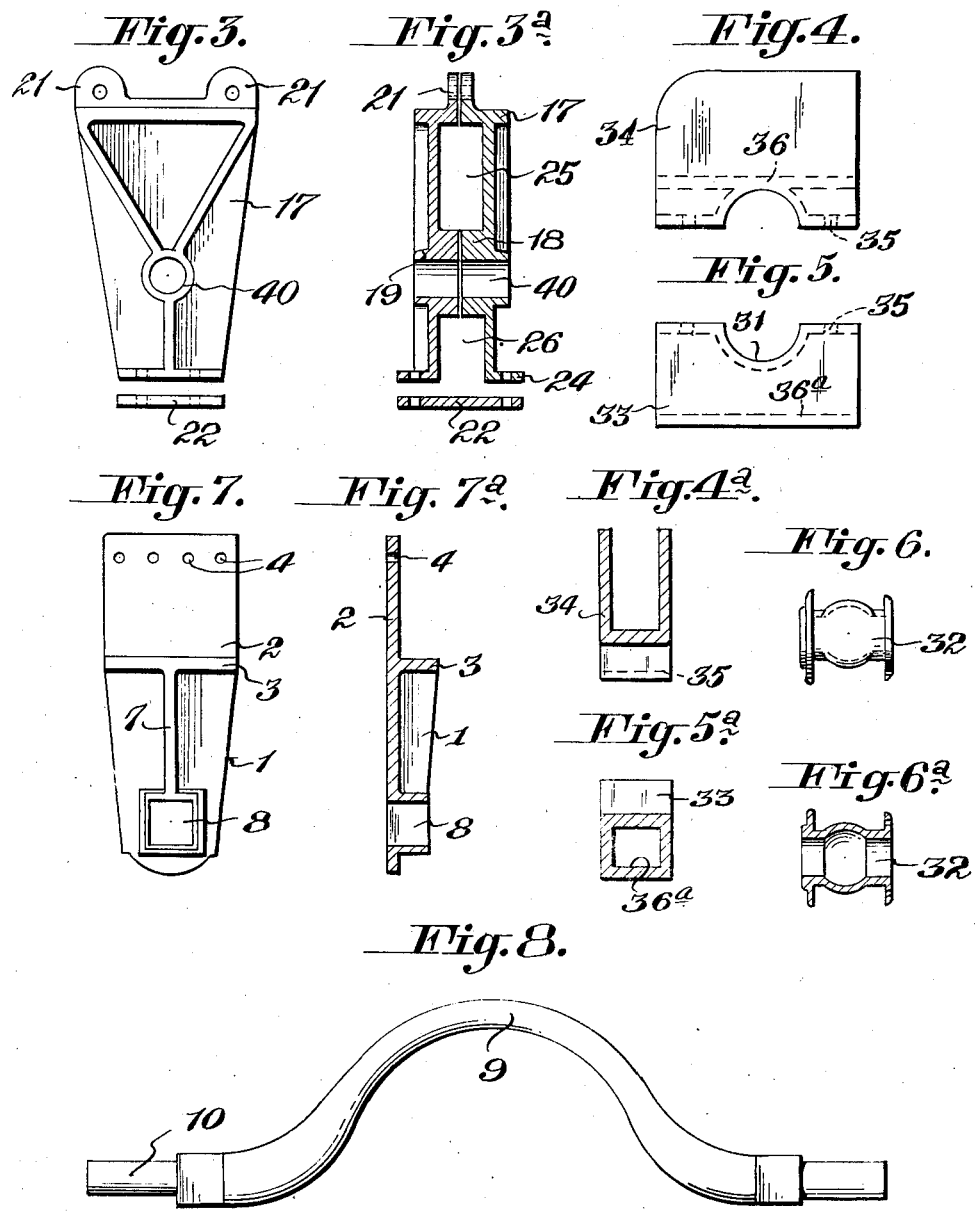

Patented Feb. 22, 1938

2,109,191

UNITED STATES PATENT OFFICE 2,109,191

SUSPENSION AND DRIVING SYSTEM FOR MOTOR VEHICLES

Francisco Contardi, Buenos Aires, Argentina

Application October 21, 1935, Serial No. 46,044
In Argentina October 24, 1934

1 Claim. (Cl. 180—22)

This invention is concerned with improvements in the mechanical structure of the organisms intended to serve as a suspension for the frames of motor vehicle bodies relatively to the wheel axles of the traction gear when the propelling gear includes a double set of rear wheels arranged in tandem or successive sequence.

A feature of the present invention resides in arranging for a double set of springs on each side of the vehicle to be secured with their middle portion in a central body which while exerting a clamping action on the said springs also serves as a bearing for a connecting bar secured to the lower portion of the frame.

A still further feature of this invention is constituted by the mechanical clamping which ensures the stationary position relatively to the frame of a connecting bar in the form of a yoke which is held by two diagonally running braces at the point of intersection. The extreme ends of this bar are secured together with said diagonal braces on the bearing boxes for the frame.

Figure 1:
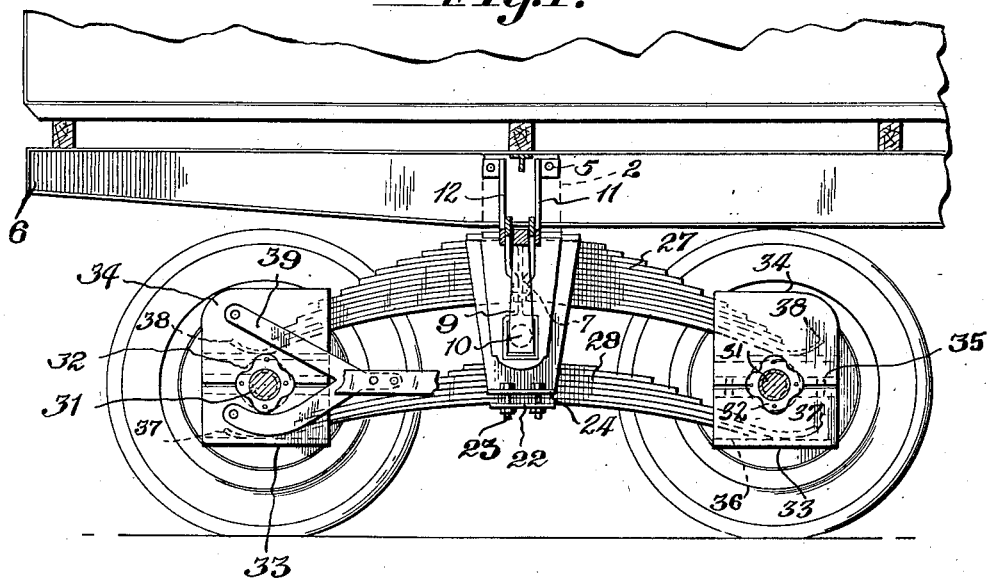
Figure 2:
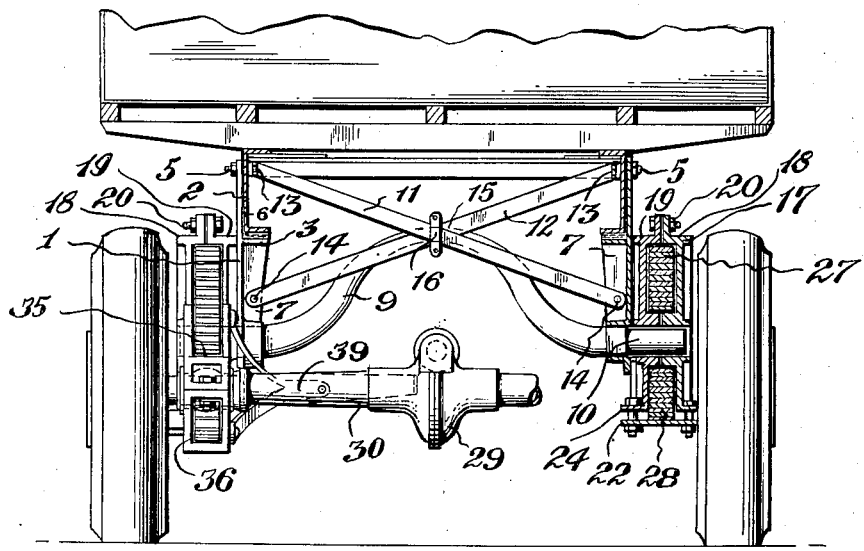

Other features of this invention may be appreciated in fuller details by referring to the accompanying drawings which illustrate the constructional characteristics of the structure and the nature of this invention. In these drawings:

Figure 1 is a lateral view of the traction gear and the suspension system,

Figure 2 illustrates one of the pairs of wheels of the propelling gear seen from rear and a part section at their mean vertical axis through a set of springs, Figure 3 is a side view of the box enclosing the central portion of the springs, Figure 3a is a cross section of the box shown in Figure 3, Figures 4 and 5 are side elevations of the two part bearing boxes for the ends of the springs, Figures 4a and 5a are cross sections respectively of Figures 4 and 5, Figures 6 and 6a show the journal box of the driving axles of the drive wheels, Figures 7 and 7a are front and sectional views, respectively of the central support of the traction gear, and Figure 8 shows the yoke drawn in profile.

Each bearing box or support 1 for the main frame 6 is provided at its top end 2 with a transverse seat 3 with bolt holes 4 for the bolts 5 for securing the support to the main frame 6. A rib 7 of the support 1 extends from the seat 3 and terminates in a quadrangular hollow bearing space 8 in which is inserted the square portion adjacent to end 10 of the connecting bar or yoke 9 in such a manner that its cylindrical end 10 remains free. There is one such support 1 with bearing space for each of the extremities of said bar.

Two diagonal braces 11 and 12 are firmly secured at their upper ends to the inner portion 13 of the frame 6 and their lower ends 14 secured to the rib 7 of the support 1.

At the central crossing point 15 of the two diagonal braces 11 and 12 a clip 16 is located which secures two diagonal braces and the connecting bar or yoke 9.

Juxtaposed to the outside of the frame support 1 is located the box 17 constituted by two adjacent halves 18 and 19 held together by the bolts 20 which run through the orifices of the ears 21 in the upper portion. The cylindrical end 10 of the yoke 9 engages in the central bore 40 of the box 17. A bottom plate 22 is secured by the bolts 23 to the flanges 24 of the box. Two quadrangular spaces 25 and 26 serve as a housing respectively for the leaves of the upper spring 27 and for the leaves of the lower spring 28 respectively.

The halves 18 and 19 of this box compress the leaves of the springs at their middle portion and constitute a central bearing therefor.

Each of the rear wheels of the driving system is equipped with the usual gearing contained in a central case 29 namely the respective differentials having the general construction usual in this type of mechanism, with its two tubular branches 30. The impelling and differential elements are connected by means of the driving shafts 31 to the corresponding transverse wheels.

The driving shaft 31 passes through a journal box 32 housed within a bearing box divided into two halves 33 and 34 which are clamped together by means of bolts running through the orifices 35 to hold said box 32. This supporting box consisting of the halves 33 and 34 has two platforms one upper 36 and one lower 36a for the spring leaves 37 and 38 to rest on with their ends which are slightly bent upwardly in order that the displacement due to the motion may facilitate the necessary sliding of these ends on the platforms in question.

The boxes 33, 34 are held in position by means of a system of rigid braces 39 which interconnect these supporting boxes, in order that the whole system of the four wheels may uniformly oscillate.

The oscillation of the whole gear system takes place at the cylindrical ends 10 of the yoke or connecting bar 9 which enter the corresponding bore 40 of the central portion of the box 17 which clamps the springs. From this it will be clear that, as a consequence of the rigid structure which supports this yoke or bar 9, the longitudinal oscillation of the system takes place about the axes of the ends 10, whereas the partial variations rebound upon and cause reaction in the respective springs 27 and 28 at both sides and naturally in the vertical plane.

It is desired to point out that this invention combines all the mechanisms shown and described, by virtue of their construction and mutual relationship.

I claim:—

A suspension and driving system for motor vehicles provided with a main frame and a pair of driving wheels positioned in tandem on each side of the frame; comprising a pair of superimposed springs for each pair of wheels, a bearing box adapted to firmly clamp together said pair of springs, a yoke having cylindrical ends journaled in each of said bearing boxes, a bracket adjacent to each of said bearing boxes and firmly secured both on said yoke and said main frame, each bracket having firm connection with the respective portions adjacent said ends of said yoke, a pair of transverse braces having their lower ends secured in said brackets and their upper ends secured to the main frame, said braces crossing at the middle portion and a clamp engaging said middle portion and said yoke, an axle box for each wheel and rigid longitudinal connection between the axle boxes for each pair of wheels, axle arms for said wheels revolubly mounted in said bearing boxes and differential gears connecting two of said wheels on opposite sides of the frame; whereby the two rearmost wheels of said tandem pairs of wheels have a common differential gear connection, and the two foremost wheels thereof have similar gear connection and each pair of tandem wheels is adapted to oscillate in the same vertical plane around one of said cylindrical ends of the yoke.

FRANCISCO CONTARDI.